US009890628B2

(12) United States Patent
Sin et al.

(10) Patent No.: US 9,890,628 B2
(45) Date of Patent: Feb. 13, 2018

(54) FRACTURING DEVICE USING SHOCKWAVE OF PLASMA REACTION AND METHOD FOR EXTRACTING SHALE GAS USING SAME

(71) Applicant: GREEN SCIENCE CO. LTD., Taebaek-si, Gangwon-do (KR)

(72) Inventors: Yoong Wook Sin, Pohang-si (KR); Chang Woo Ok, Pohang-si (KR); Bong Ju Lee, Pohang-si (KR)

(73) Assignee: GREEN SCIENCE CO. LTD., Taebaek-si, Gangwon-do (KR)

( * ) Notice: Subject to any disclaimer, the term of this patent is extended or adjusted under 35 U.S.C. 154(b) by 0 days.

(21) Appl. No.: 15/129,826

(22) PCT Filed: Apr. 3, 2015

(86) PCT No.: PCT/KR2015/003344
§ 371 (c)(1),
(2) Date: Sep. 28, 2016

(87) PCT Pub. No.: WO2015/152670
PCT Pub. Date: Oct. 8, 2015

(65) Prior Publication Data
US 2017/0138163 A1 May 18, 2017

(30) Foreign Application Priority Data

Apr. 3, 2014 (KR) .................. 10-2014-0039852
Feb. 23, 2015 (KR) .................. 10-2015-0025305

(51) Int. Cl.
*E21B 7/00* (2006.01)
*E21B 43/26* (2006.01)
(Continued)

(52) U.S. Cl.
CPC .............. *E21B 43/263* (2013.01); *C09K 8/62* (2013.01); *C09K 8/80* (2013.01); *E21B 43/003* (2013.01); *E21B 43/267* (2013.01); *E21B 47/06* (2013.01)

(58) Field of Classification Search
CPC .......... E21B 7/15; E21B 43/26; E21B 43/263; E21B 43/267; E21B 43/247
See application file for complete search history.

(56) References Cited

U.S. PATENT DOCUMENTS

| | | |
|---|---|---|
| 5,106,164 A | 4/1992 | Kitzinger et al. |
| 5,482,357 A | 1/1996 | Wint et al. |
| (Continued) | | |

FOREIGN PATENT DOCUMENTS

| | | |
|---|---|---|
| JP | 2003-326188 A | 11/2003 |
| KR | 10-1998-0702571 A | 7/1998 |

OTHER PUBLICATIONS

International Search Report for PCT/KR2015/003344 dated Apr. 29, 2015 from Korean Intellectual Property Office.

*Primary Examiner* — Zakiya W Bates
(74) *Attorney, Agent, or Firm* — Revolution IP, PLLC

(57) ABSTRACT

A fracturing device using a shock wave of a plasma reaction includes a partition unit for partitioning a reaction space such that a reaction medium is accommodated therein, by sealing a part having a plurality of through-holes among well casing of a gas well provided at shale rock layer so as to extract shale gas and a probe for applying energy to the reaction medium such that the reaction medium generates shock wave by a plasma reaction as the energy is applied to the reaction medium accommodated inside the reaction space, so as to propagate shock wave to the shale rock layer.

14 Claims, 6 Drawing Sheets

(51) Int. Cl.
*E21B 43/263* (2006.01)
*E21B 43/267* (2006.01)
*C09K 8/62* (2006.01)
*C09K 8/80* (2006.01)
*E21B 43/00* (2006.01)
*E21B 47/06* (2012.01)

(56) References Cited

U.S. PATENT DOCUMENTS

2013/0161007 A1 6/2013 Wolfe et al.
2015/0167440 A1* 6/2015 Kasevich .............. E21B 33/124
 166/52

* cited by examiner

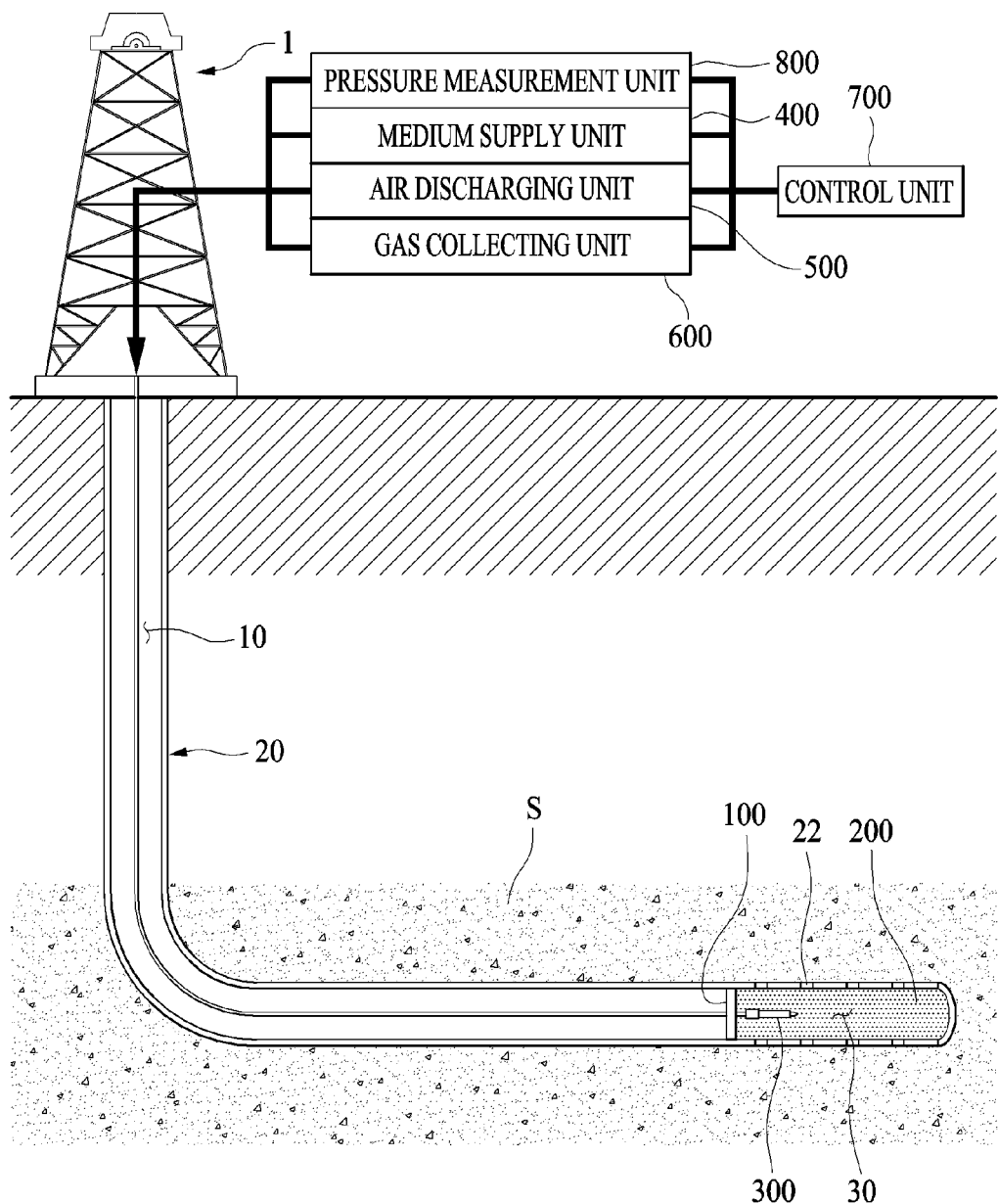

【Fig. 2】
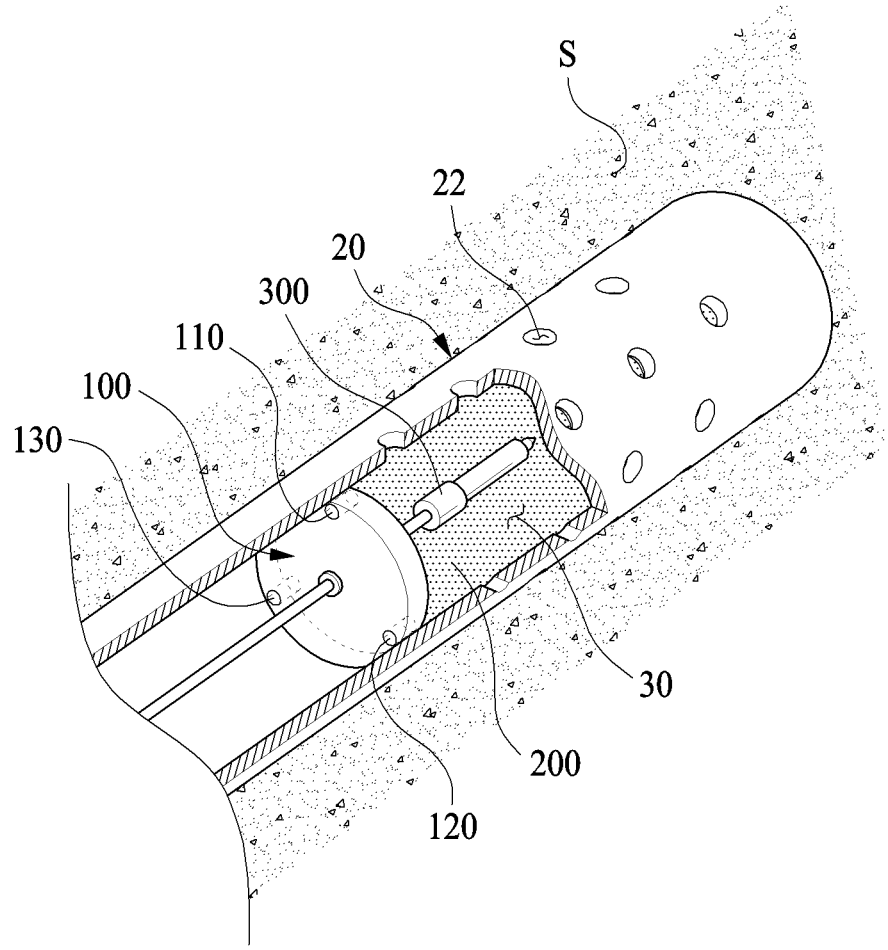

【Fig. 3】
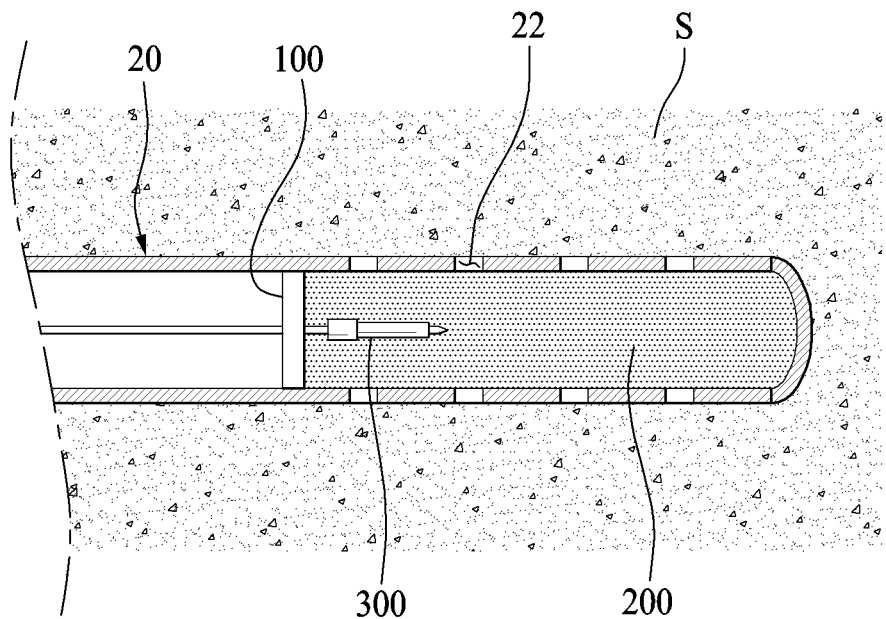
【Fig. 4】
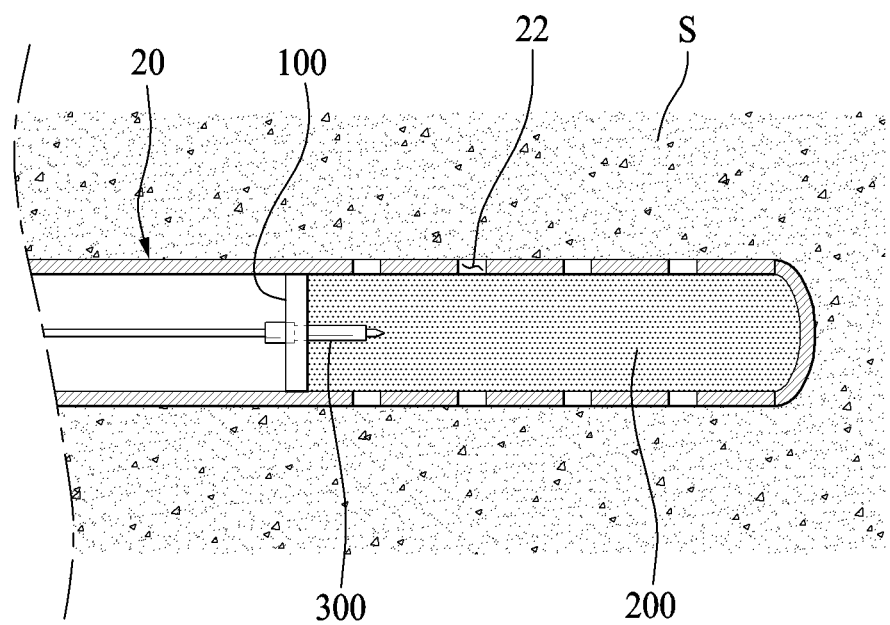

[Fig. 5]
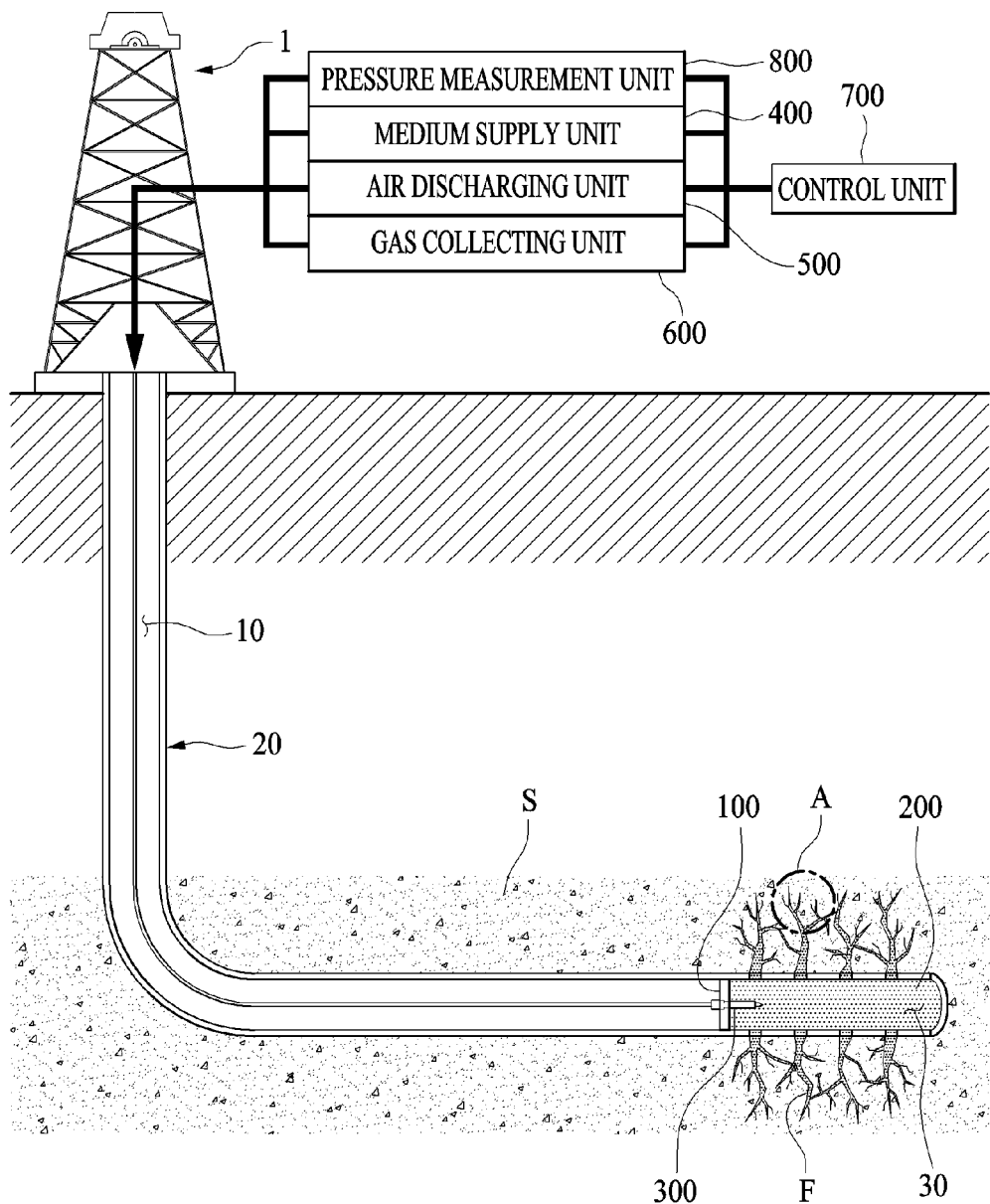

【Fig. 6】
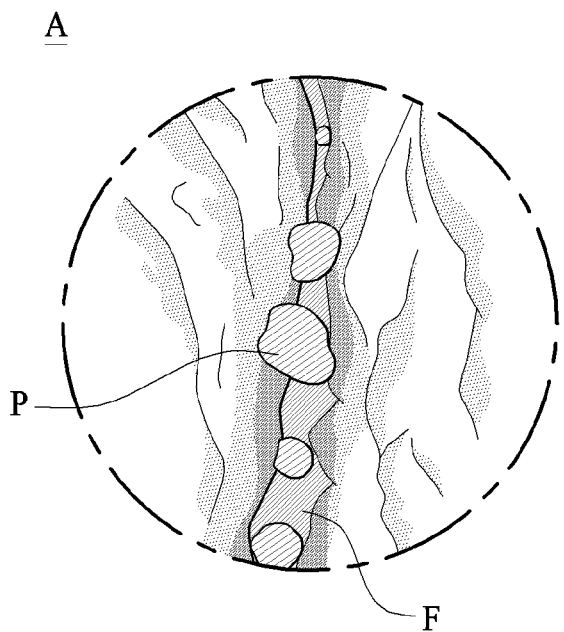
【Fig. 7】
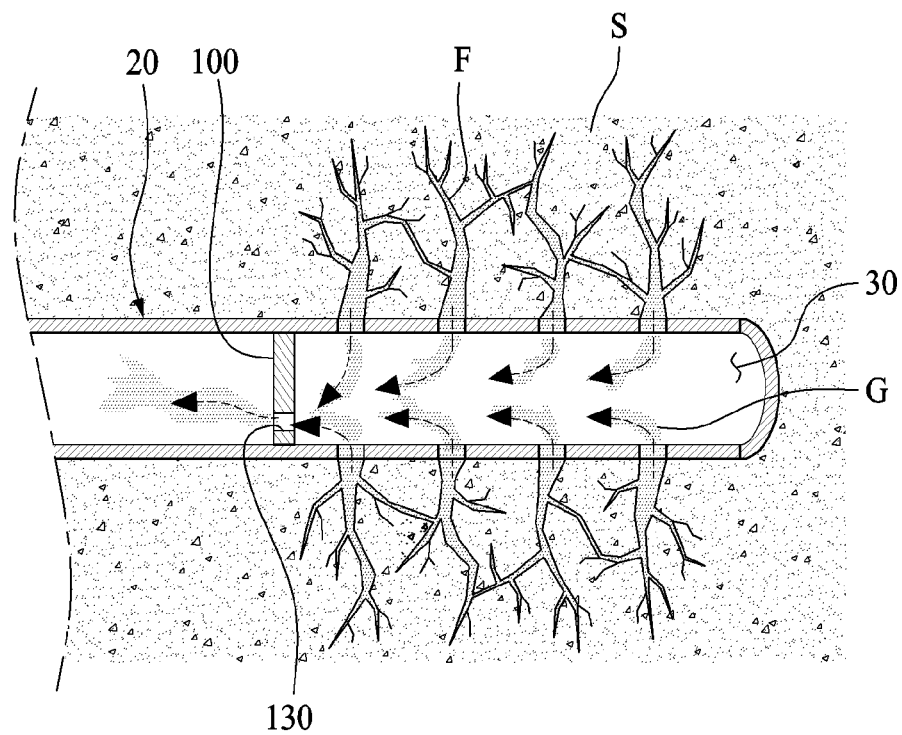

[Fig. 8]
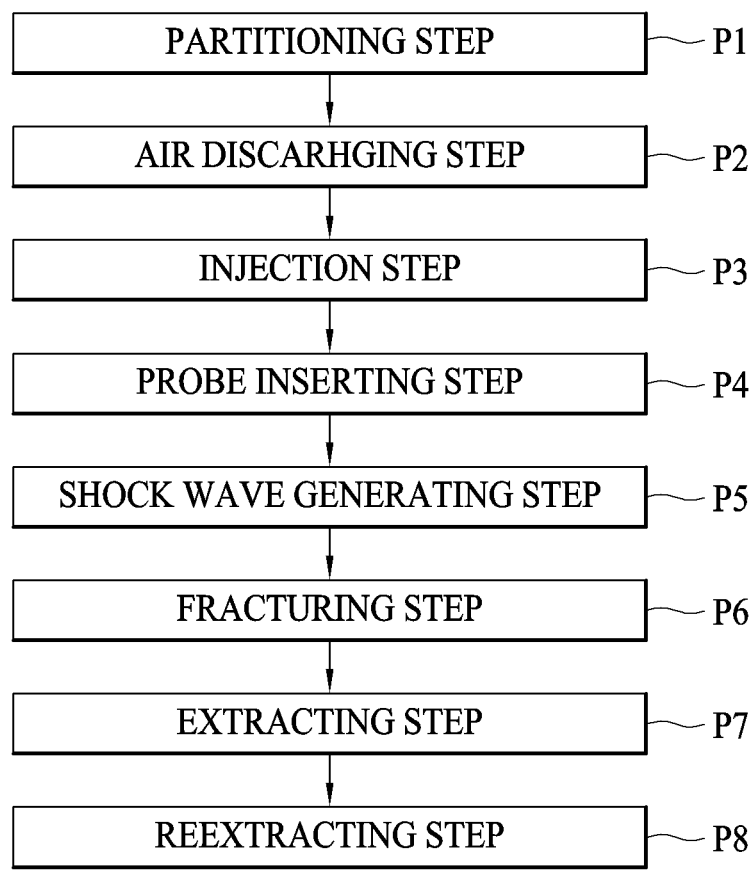

FRACTURING DEVICE USING SHOCKWAVE OF PLASMA REACTION AND METHOD FOR EXTRACTING SHALE GAS USING SAME

CROSS REFERENCE TO PRIOR APPLICATIONS

This application is a National Stage Application of PCT International Patent Application No. PCT/KR2015/003344 filed on Apr. 3, 2015, under 35 U.S.C. § 371, which claims priority to Korean Patent Application Nos. 10-2014-0039852 filed on Apr. 3, 2014 and 10-2015-0025305 filed on Feb. 23, 2015 which are all hereby incorporated by reference in their entirety.

TECHNICAL FIELD

The present invention relates to a fracturing device using shock wave of a plasma reaction and a method for extracting shale gas using the same in which a shale rock layer is fractured with shock wave from a plasma reaction of a reaction medium.

BACKGROUND ART

A shale gas is a kind of natural gases remaining in a shale rock layer as a sedimentary rock. Petroleum, natural gas, etc., as existing natural resource exist in a reservoir rock such as a sand stone, lime stone, dolomite, etc., having porosity and permeability, and have congregated collectively in a specific area, while the shale gas is distributed widely in a horizontal direction along a shale rock layer having very small porosity and permeability and thus has a feature of efficient existing resource for a horizontal boring.

As a representative method for extracting shale gas, a fracturing method is referred, generating fractures in shale rock layer by pressure of fluid.

Specially, high pressure fluid prepared by mixing chemical substance such as benzene, water and sand is injected into an oil well and a gas well to generate fractures in a shale rock layer with hydraulic pressure, which is referred as a hydraulic fracturing method or a fracking method.

However, since a huge amount of water needs in a case of existing hydraulic fracturing method, there arise problems that a water source needs to be located nearby to improve efficiency and high development cost is required according to various utility establishments for supplying water and treating waste water.

Further, there arises a problem that nearby rock layer and underground water are contaminated due to contaminated substance produced during fracturing process.

Meanwhile, since a huge amount of LPG needs in a case of a fracturing method using LPG instead of water, there arise problems that it is not efficient in terms of economical aspect and further a risk of a big accident exists due to explosion of LPG in a high pressure state.

DISCLOSURE

Technical Problem

An technical problem to be solved by the present invention is to provide a fracturing device using shock waves of a plasma reaction and a method for extracting shale gas using the same in order to solve the problems caused from a conventional fracturing process for extracting shale gas, in which the amount of reaction medium to be used for the process is decreased to reduce risk of explosion accident, the cost is lowered and environment is not contaminated to be safe.

The technical problem to be solved by the present invention is not limited to the problems described above and other technical problems not stated obviously could be understood to a person who has an ordinary skill in the art to which the present invention pertains from the below description.

Technical Solution

In order to solve the above problems a fracturing device using shock wave of a plasma reaction according to an embodiment of the present invention may include: a partition unit for partitioning a reaction space into which a reaction medium is accommodated, by sealing a part of a well casing of a gas well arranged on a shale rock layer for extracting shale gas; and a probe for applying energy into the reaction medium to be accommodated into the reaction space to generate shock waves with a plasma reaction of the reaction medium to be propagated to the shale rock layer.

The fracturing device using shock wave of a plasma reaction of the present invention may further include a medium supply unit for supplying the reaction medium into the reaction space.

The partition unit may be provided with a medium inlet through which the reaction medium is injected into the reaction space.

The reaction medium may include liquefied petroleum gas components formed as a gel state or liquefied state.

The reaction medium may be mixed with proppant.

The fracturing device using shock wave of a plasma reaction of the present invention may further include an air discharging unit for discharging air inside the reaction space outside.

The partition unit may be provided with an air outlet through which air remaining inside the reaction space is discharged outside.

The fracturing device using shock wave of a plasma reaction of the present invention may further include a gas collecting unit for collecting the shale gas which is accommodated into the reaction space through the through holes after the shale rock layer is fractured.

The partition unit may be provided with a gas extraction port through which the shale gas which is accommodated into the reaction space through the through holes is discharged outside after the shale rock layer is fractured.

The fracturing device using shock wave of a plasma reaction of the present invention may further include a pressure measurement unit for sending the amount of the reaction medium by measuring pressure within the reaction space.

A method for extracting shale gas using shock wave of a plasma reaction according to an embodiment of the present invention may include the steps of: partitioning a reaction space by a partition unit to seal a part of a well casing of a gas well arranged on a shale rock layer to extract the shale gas; injecting a reaction medium into the reaction space; generating shock waves with a plasma reaction by applying energy into the reaction medium accommodated into the reaction space; fracturing the shale rock layer with the shock waves which is generated at the shock wave generating step and propagated to the shale rock layer by the reaction medium; and extracting the shale gas through the fractures of the shale rock layer which is generated at the fracturing step.

The method for extracting shale gas using shock wave of a plasma reaction of the present invention may further include a step of discharging air remaining inside the reaction space.

The method for extracting shale gas using shock wave of a plasma reaction of the present invention may further include a step of inserting a probe to apply energy to the reaction medium which is accommodated into the reaction space.

The partitioning step may be performed before or after the probe inserting step.

The injection step may be performed before or after the probe inserting step.

The method for extracting shale gas using shock wave of a plasma reaction of the present invention may further include a step of re-extracting the shale gas remaining at the shale rock layer by injecting additionally the reaction medium into the reaction space after the extraction step.

Advantageous Effects

The fracturing device having the above configuration according to the present invention has the following effects.

Firstly, since a shale rock layer is fractured with shock wave of a plasma reaction, the environment is less contaminated and the investment for various utilities is less made, comparing to the conventional water pressure fracture.

Further, since fracturing is made only at a sealed part of a well casing of a gas well, the amount of reaction medium used for fracturing a shale rock layer (for example, fluid containing LPG) is reduced prominently and thus the risk of explosion accident is decreased to be safe, comparing to the fracturing using LPG.

In addition, since low vibration and low noise process is used, its application range is wide and there is no environmental hazardous factors.

Meanwhile, the effects of the present invention is not limited to the effects described above and other effects not stated obviously could be understood to a person who has an ordinary skill in the art to which the present invention pertains from the description of claims.

DESCRIPTION OF DRAWINGS

FIG. 1 is a view illustrating an environment at which an embodiment of the present invention is implemented.

FIG. 2 is a view illustrating a partition unit and a reaction space according to an embodiment of the present invention.

FIGS. 3 to 4 are views illustrating an example where a probe is inserted at a probe inserting step according to an embodiment of the present invention.

FIG. 5 is a view illustrating a fracturing step according to an embodiment of the present invention.

FIG. 6 is a view illustrating fractures of shale rock layer, which are generated at a fracturing step according to an embodiment of the present invention, and proppants introduced into the fractures.

FIG. 7 is a view illustrating an extraction step according to an embodiment of the present invention.

FIG. 8 is a flowchart showing a method for extracting shale gas according to an embodiment of the present invention.

BEST MODE

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

The present invention is not limited to the aforementioned exemplary embodiment and an application range is various and it is apparent that various modifications can be made to those skilled in the art without departing from the spirit of the present invention described in the appended claims.

Firstly, a constitution of a fracturing device according to an embodiment of the present invention will be described in detail, referring to FIGS. 1 and 2. Here, FIG. 1 is a view illustrating an environment at which an embodiment of the present invention is implemented and FIG. 2 is a view illustrating a partition unit 100 and a reaction space 30 according to an embodiment of the present invention.

As shown in FIGS. 1 and 2, a fracturing device according to an embodiment of the present invention may include a gas well 1 arranged on a boring hole 10, a partition unit 100 for sealing a part of a well casing 20 of the gas well and partitioning a reaction space 30, and a probe 300 disposed for applying energy to a reaction medium 200 that is accommodated in the reaction space 30.

Here, the boring hole 10 means a kind of hole which is formed through a shale rock layer S where shale gas exists from a ground through a separate process.

Meanwhile, the gas well 1 includes a well casing 20 formed along full length of the boring hole 10 not to be collapsed as a winze and various utilities therefor arranged on the boring hole 10 so as to extract shale gas from the boring hole 10.

A plurality of through holes 22 may be provided fully through an outer surface of the well casing 20, contacting the shale rock layer S, from an inner surface thereof through a separate process.

The partition unit 100 may be arranged inside the well casing 20 such that a part of inner space of the well casing 20, along which a plurality of through holes are provided, is sealed from other parts, and thus the reaction space 30 may be partitioned.

The partition unit 100 may be formed with strong material enough to endure the shock wave when shock wave is generated by plasma reaction in the reaction space 30.

Meanwhile, the reaction medium 200 to be accommodated in the reaction space 30 partitioned by the partition unit 100 may include liquefied petroleum gas components containing propane, propylene, butane and butylenes, etc.

Further, the reaction medium 200 may be composed of a gel state or liquefied gas state formed with mixing propane, butane and hydrocarbon, and in this case the reaction medium is not reacted with salt or soil contained in the shale rock layer S, thereby not contaminating underground water or soil.

In addition, the reaction medium 200 may be composed of electrolytic substance dissolved-water or electrolyte prepared by mixing water and synthetic resin as a gel type wherein the composition and form thereof are not limited and it is clear that the right scope of the invention is not limited therefrom.

Further, the proppant P composed of sand, ceramic, resin-coated or similar substance may be mixed to the reaction medium 200.

The probe 300 may be arranged to be inserted fully into the reaction space 30 or a part thereof may be inserted therein so as to apply energy to the reaction medium 200.

The probe 300 may control the amount of energy to be applied to the reaction medium 200 according to process efficiency and site circumstances, and further may be formed integrally with the partition unit 100.

Meanwhile, as shown in FIGS. 1 and 2, according to an embodiment of the present invention, a medium supply unit 400, an air discharging unit 500, a gas collection unit 600 and a control unit 700 may be further provided to the gas well 1, and a medium inlet 110, air outlet 120 and a gas extraction port 130 may be further provided to the partition unit 100.

Here, the medium supply unit 400 may supply the reaction medium 200 into the reaction space 30 through the gas well 1.

The medium supply unit 400 may be composed of a pressure pump including hydraulic pump and motor operated-pump and in this case the kind and configuration of the pump are not limited.

Further, the medium supply unit 400 may inject the reaction medium 200 into the reaction space 30 through a proper fluid path including a pipe and a conduit, etc.

At this time, a medium inlet 110 may be provided on the partition unit 100, through which the reaction medium 200 is injected to the sealed reaction space 30 by the partition unit 100 with the medium supply unit 400.

The medium inlet 110 is provided on one side of the partition unit 100 and connected to the medium supply unit 400 to serve as a path through which the reaction medium 200 is injected into the reaction space 30 wherein the medium inlet can be opened/closed such that the reaction medium 200 is to flow only to the inside of the reaction space 30 from the outside, or can be composed of a check valve such that the reaction medium flows only to one direction.

Meanwhile, the air discharging unit 500 may be composed of a vacuum pump such as a piston pump and rotary pump so as to discharge the air remaining in the reaction space 30 wherein a diffusion pump, a jet pump and a mechanical vacuum pump may be combined.

The air discharging unit 500 may be formed in a small size to be inserted into the well casing 20 and connected directly to the reaction space 30 in a state of being adjacent to the partition unit 100 or connected to the reaction space 30 through a proper fluid path including a pipe and a conduit, etc., to discharge outside the air remaining inside the reaction space 30.

At this time, an air outlet 120 may be further provided on the partition unit 100 so as to discharge outside the air remaining inside the reaction space 30 sealed by the partition unit 100 through the air discharging unit 500.

The air outlet 120 is provided on one side of the partition unit 100 and connected to the air discharging unit 500 to serve as a path through which the air remaining inside the reaction space 30 is discharged outside wherein the air outlet can be opened/closed such that the air is to flow only to the outside of the reaction space 30 from the inside, or can be composed of a check valve such that the air flows only to one direction.

Further, a gas collecting unit 600 may be composed of a pressure pump which is capable of collecting the shale gas to be accommodated into the reaction space 30 through the through hole 22 after the shale rock layer S is fractured.

The gas collecting unit 600, similarly to the medium supply unit 400, may be hydraulic device or motor-operated device wherein its kinds or configurations are not limited, and further similarly to the air discharging unit 500, may be formed in a small size to be inserted into the well casing 20 and connected directly to the reaction space 30 in a state of being adjacent to the partition unit 100 or connected to the reaction space 30 through a proper fluid path including a pipe and a conduit, etc., to collect the shale gas.

At this time, a gas extraction port 130 may be further provided on the partition unit 100 so as to extract the shale gas accommodated inside the reaction space 30 sealed by the partition unit 100 through the gas collecting unit 600.

The gas extraction port 130 is connected to the gas collecting unit 600 to serve as a path through which the shale gas to be accommodated inside the reaction space 30 is extracted outside wherein the gas extraction port 130, similarly to the medium inlet 110 and the air outlet 120, may be provided on one side of the partition unit 100 and can be opened/closed or can be composed of a check valve such that the air flows only to one direction.

Meanwhile, the medium inlet 110, the air outlet 120 and the gas extraction port 130 may be provided as one component and formed for being both-used as various paths through which the reaction medium 200, air and shale gas can flow depending on the processes.

Addition, a pressure measurement unit 800 for sensing the amount of the reaction medium 200 inside the reaction space 30 may be provided. The pressure measurement unit 800 estimates and senses the amount of the reaction medium 200 by measuring the pressure inside the reaction space 30.

Further, the whole operations of the medium supply unit 400, the air discharging unit 500 and the gas collecting unit 600 may be controlled by a control unit 700.

The control unit 700 may control fluid flow and flow pressure, etc., of the reaction medium 200, the air and the shale gas, which flow through the medium supply unit 400, the air discharging unit 500 and the gas collection unit 600, respectively.

Furthermore, the control unit 700 may control the opening/closing of the medium inlet 110, the air outlet 120 and the gas extraction port 130 and control all relays and operation situations of the probe 300, and may be formed to control the communication with the above components.

In addition, the control unit 700 may estimate the amount of the reaction medium 200 inside the reaction space 30 through the pressure value inside the reaction space 30, measured from the pressure measurement unit 800.

Next, referring to FIGS. 3 to 8, an embodiment of the method for extracting shale gas using shock wave of a plasma reaction according to the present invention will be described in detail. The order of the present embodiment, which will be described later, is illustrative only for helping the understanding of the detailed description and thus the order may be changed variously without limitation depending on the process efficiency and site situation and it is clear that the right scope of the present invention is not limited therefrom.

Firstly, as shown in FIG. 8, the method for extracting shale gas according to the present embodiment may include a partitioning step P1, an air discharging step P2 and an injection step P3. Here, FIG. 8 is a flow chart showing a method for extracting shale gas according to an embodiment of the present invention.

In the partitioning step P1, as described above in the configuration of the present embodiment, a part of the well casing 20 along which a plurality of through holes 22 are provided is partitioned as the reaction space 30 sealed from other parts by the partition unit 100.

Subsequently, an air discharging step P2 may be performed for discharging the air remaining inside the reaction space 30 partitioned at the partitioning step P1.

In the air discharging step P2 the air remaining inside the reaction space 30 may be discharged outside through the air discharging unit 500 connected to the air outlet 120 which is provided on the partition unit 100.

Further, an injection step P3 may be performed for injecting the reaction medium 200 into the reaction space 30 partitioned through the partitioning step P1.

At this time, the reaction medium 200 is injected into the reaction space 30 by the medium supply unit 400, as described above in the configuration of the present embodiment, and may be injected into the sealed reaction space 30 through the medium inlet 110 of the partition unit 100 connected to the medium supply unit 400.

As described above, the order of the air discharging step P2 and the injection step P3 may be varied according to the process efficiency and site situation, as described above.

For example, the injection step P3 may be performed for injecting the reaction medium 200 into the reaction space 30 the vacuum degree of which is controlled through the air discharging step P2 for discharging outside the air remaining inside the reaction space 30 partitioned through the partitioning step P1, or the reaction medium 200 is injected into the reaction space 30 through the injection step P3 and then the air discharging step P2 may be performed for discharging outside the air remaining inside the reaction space 30.

Next, as shown in FIGS. 3 and 4, a probe inserting step P4 may be further included in the present embodiment. Here, FIGS. 3 to 4 are views illustrating an example where a probe is inserted at a probe inserting step according to an embodiment of the present invention.

In the probe inserting step P4 a probe 300 may be disposed for applying energy to the reaction medium 200 accommodated inside the reaction space 30.

In this probe inserting step P4 the probe 300 may be arranged to be submerged in the reaction medium 200 while it passes through the partition unit 100 and disposed inside the reaction space 30 (see FIG. 3).

Furthermore, the probe 300 may be arranged such that a part thereof is inserted into the reaction space 30 to contact the reaction medium 200 while it becomes adjacent to the partition unit 100 or separated from the partition unit 100 (see FIG. 4).

Additionally, in a case where the probe 300 is formed integrally with the partition unit 100, the probe inserting step P4 is performed simultaneously with the partitioning step P1 and then the air discharging step P2 and the injection step P3 may be performed.

Further, the partitioning step P1 or the injection step P3 may be performed before or after the probe inserting step P4 is performed.

That is, after the reaction space 30 is partitioned by the partition unit 100 while the probe 300 has been already inserted into the inner space of the well casing 20 to be partitioned as the reaction space 30, the reaction medium 200 may be inserted into the reaction space 30.

Next, as shown in FIG. 5, according to the present embodiment, a shock wave generating step P5 and a fracturing step P6 may be further included. Here, FIG. 5 is a view illustrating a fracturing step P6 according to the present embodiment.

The shock wave generating step P5 may be performed for applying energy into the reaction medium 200 with the probe 300 to be contacted with the reaction medium 200 through the probe inserting step P4.

As a result, the reaction medium 200 adjacent to the probe 300 can be converted into a plasma state of high density by receiving the energy and the energy to be applied into the reaction medium 200 through the probe 300 may be controlled by the control unit 700.

Meanwhile, shock waves are generated inside the reaction space 30 due to rapid state changes therein caused from the reaction medium which has been converted into the plasma state of high density, and the shock waves may be propagated to other points from the generation point through the reaction medium 200.

Further, according to the present embodiment a fracturing step P6 may be performed consecutively, following the shock wave generation step P5.

In the fracturing step P6 the shock waves generated at the shock wave generating step P5 may be propagated to a shale rock layer S adjacent to the reaction space 30 through the through holes 22 provided along the well casing 20 partitioned as the reaction space 30.

Additionally, the shock wave generating step P5 may be performed sufficiently even at the reaction space 30 partitioned by the partitioning step P1 to be performed on the well casing 20 where a separate process for providing the through holes 22 is omitted.

In this case, even not shown in the drawings, the shock waves generated at the reaction space 30 is propagated firstly to the well casing 20 to produce irregular cracks therein and the cracks may perform the same role as the through hole 22.

That is, the shock waves may be propagated secondly to the shale rock layer S adjacent to the reaction space 30 through the ends of the cracks.

As a result, fractures F or cracks may be generated in the shale rock layer S which receives the shock waves.

At this time, as shown in FIG. 6, the proppant P mixed with the reaction medium P is introduced into the fracture F or crack generated in the shale rock layer S and keeps a gap through which the shale gas is extracted to flow. Here, FIG. 6 is a view illustrating fractures F of shale rock layer, which are generated at a fracturing step according to an embodiment of the present invention, and proppants P introduced into the fractures F.

Next, as shown in FIG. 7, the present embodiment may include an extraction step P7. Here, FIG. 7 is a view illustrating an extraction step P7 according to an embodiment of the present invention.

In the extraction step P7 the shale gas G may be extracted, which is accommodated inside the reaction space 30 from the fracture F of the shale rock layer S that is fractured through the fracturing step P6.

At this time, the shale gas G may flow inside the reaction space 30 through the through holes of shock wave propagation paths, which are provided along the well casing 20 partitioned as the reaction space 30.

Likewise, the shale gas G which is accommodated inside the reaction space 30 may be extracted outside through a gas collecting unit 600 which is connected to the gas extraction port 130 provided through the partition unit 100.

Meanwhile, as shown in FIG. 8, the present embodiment may further include a re-extraction step P8 in which the shale gas G remaining in the shale rock layer S is extracted additionally after the extraction step P7.

Even after the shale gas G is extracted through the extraction step P7, since there remains a considerable amount of shale gas G within the shale rock layer S and the fracture F, a process for extracting additionally the shale gas G may need.

Accordingly, in the re-extracting step P8 the reaction medium 200 is injected additionally inside the reaction space 30 through the medium supply unit 400 connected to the medium inlet 110, and if necessary, the reaction medium 200 may be compressed such that the reaction medium 200 is introduced into the fracture F generated in the shale rock layer S to apply pressure thereto.

When the reaction medium 200 is injected additionally into the reaction space 30, the control unit 700 determines and injects the amount of the reaction medium 200 to be injected additionally as the amount of the reaction medium 200 that is measured or estimated at the pressure measurement unit 800.

As a result, the pressure is applied to the shale gas G remaining within the shale rock layer S and the fracture F through the reaction medium 200 and when the pressure is removed, the remained shale gas G is accommodated into the reaction space 30 through the through hole 22 according to the pressure decrease.

At this time, the shale gas G which is accommodated into the reaction space 30 through the re-extraction step P8 may be extracted outside through the gas collecting unit 600 connected to the gas extraction port 130 provided through the partition unit 100, similarly to the extraction step P7.

Meanwhile, the embodiment of the present invention of a method for extracting shale gas using shock waves of a plasma reaction may be performed repeatedly on other parts of the well casing 20 wherein a series of the methods for extracting shale gas are performed repeatedly to extract the shale gas G existing in a horizontally bored shale rock layer G.

The fracturing method using shock waves of a plasma reaction is performed at a defined local area and thus the fracturing is possible even using a small amount of the reaction medium 200, comparing to the conventional fracturing using water or LPG.

Accordingly, according to the present invention, the shale gas G can be extracted efficiently and economically and further a friendly environmental shale gas extraction method can be provided, in which the risk of explosion accident is reduced and there is no concern about environment contamination.

The exemplary embodiments of the present disclosure have been described above with reference to the accompanying drawings, but those skilled in the art will understand that the present disclosure may be implemented in another particular form without changing the technical spirit or an essential feature thereof. Therefore, the aforementioned exemplary embodiments are all illustrative and are not restricted to a limited form.

The invention claimed is:

1. A fracturing device using shock wave of a plasma reaction, comprising:
    a partition unit being disposed inside a well casing for partitioning a reaction space into which a reaction medium is accommodated, by sealing a part of the well casing of a gas well arranged on a shale rock layer for extracting shale gas, wherein the partition unit includes a medium inlet so that the reaction medium is injected into the reaction space via the medium inlet; and
    a probe being inserted into the reaction space for applying energy into the reaction medium to be accommodated into the reaction space to generate shock waves with a plasma reaction of the reaction medium to be propagated to the shale rock layer.

2. The fracturing device using shock wave of a plasma reaction of claim 1, further comprising a medium supply unit for supplying the reaction medium into the reaction space.

3. The fracturing device using shock wave of a plasma reaction of claim 1, wherein the reaction medium comprises liquefied petroleum gas components formed as a gel state or liquefied state.

4. The fracturing device using shock wave of a plasma reaction of claim 1, wherein the reaction medium is mixed with proppant.

5. The fracturing device using shock wave of a plasma reaction of claim 1, further comprising an air discharging unit for discharging air inside the reaction space outside.

6. The fracturing device using shock wave of a plasma reaction of claim 1, wherein the partition unit is provided with an air outlet through which air remaining inside the reaction space is discharged outside.

7. The fracturing device using shock wave of a plasma reaction of claim 1, further comprising a gas collecting unit for collecting the shale gas which is accommodated into the reaction space through the through holes after the shale rock layer is fractured.

8. The fracturing device using shock wave of a plasma reaction of claim 1, wherein the partition unit is provided with a gas extraction port through which the shale gas which is accommodated into the reaction space through the through holes is discharged outside after the shale rock layer is fractured.

9. The fracturing device using shock wave of a plasma reaction of claim 1, further comprising a pressure measurement unit for sending the amount of the reaction medium by measuring pressure within the reaction space.

10. A method for extracting shale gas using shock wave of a plasma reaction, comprising steps of:
    partitioning a reaction space by a partition unit to seal a part of a well casing of a gas well arranged on a shale rock layer to extract the shale gas, wherein the partition unit is disposed inside the well casing;
    injecting a reaction medium into the reaction space, wherein the partition unit includes a medium inlet so that the reaction medium is injected into the reaction space via the medium inlet;
    by a probe, generating shock waves with a plasma reaction by applying energy into the reaction medium accommodated into the reaction space, wherein the probe is inserted into the reaction space;
    fracturing the shale rock layer with the shock waves which is generated at the shock wave generating step and propagated to the shale rock layer by the reaction medium; and
    extracting the shale gas through the fractures of the shale rock layer which is generated at the fracturing step.

11. The method for extracting shale gas using shock wave of a plasma reaction of claim 10, further comprising discharging air remaining inside the reaction space.

12. The method for extracting shale gas using shock wave of a plasma reaction of claim 10, wherein the partitioning step is performed before or after the probe inserting step.

13. The method for extracting shale gas using shock wave of a plasma reaction of claim 10, wherein the injection step is performed before or after the probe inserting step.

14. The method for extracting shale gas using shock wave of a plasma reaction of claim 10, further comprising re-extracting the shale gas remaining at the shale rock layer by injecting additionally the reaction medium into the reaction space after the extraction step.

* * * * *